United States Patent
Reichgott et al.

(10) Patent No.: US 7,640,571 B1
(45) Date of Patent: Dec. 29, 2009

(54) METHOD AND APPARATUS FOR PREVENTING DISRUPTIONS IN SET-TOP TERMINAL FUNCTION DUE TO THE DOWNLOAD OF UPDATED PROGRAMMING OR DATA TO THE SET-TOP TERMINAL

(75) Inventors: Samuel Reichgott, Coopersburg, PA (US); Abhijit Chatterjee, Landsdale, PA (US); Charles Schell, Churchville, PA (US)

(73) Assignee: General Instrument Corporation, Horsham, PA (US)

( * ) Notice: Subject to any disclaimer, the term of this patent is extended or adjusted under 35 U.S.C. 154(b) by 1826 days.

(21) Appl. No.: 09/353,583

(22) Filed: Jul. 15, 1999

(51) Int. Cl.
H04N 7/10 (2006.01)
H04N 7/025 (2006.01)
H04N 7/173 (2006.01)
H04N 7/16 (2006.01)

(52) U.S. Cl. .......................... 725/142; 725/32; 725/98; 725/115; 725/136

(58) Field of Classification Search .................. 348/10, 348/564, 725; 380/10, 12, 20, 242; 386/46, 386/83; 395/307, 200.6; 455/4; 463/40; 709/217, 249, 221, 220; 725/49, 88, 134, 725/141–144; 345/719; 370/259
See application file for complete search history.

(56) References Cited

U.S. PATENT DOCUMENTS

| | | | | |
|---|---|---|---|---|
| 5,003,591 A | * | 3/1991 | Kauffman et al. | 380/10 |
| 5,093,921 A | * | 3/1992 | Bevins, Jr. | 455/4 |
| 5,247,364 A | * | 9/1993 | Banker et al. | 348/569 |
| 5,373,557 A | * | 12/1994 | Diehl et al. | 380/20 |
| 5,440,632 A | * | 8/1995 | Bacon et al. | 348/12 |
| 5,497,187 A | * | 3/1996 | Banker et al. | 725/144 |
| 5,619,250 A | * | 4/1997 | McClellan et al. | 348/10 |
| 5,635,979 A | * | 6/1997 | Kostreski et al. | 348/10 |

(Continued)

FOREIGN PATENT DOCUMENTS

EP  0 926 862 A2  6/1996

(Continued)

OTHER PUBLICATIONS

Written Opinion from International Preliminary Examination Authority, dated Jul. 25, 2001.

Primary Examiner—Dominic D Saltarelli
(74) Attorney, Agent, or Firm—Stewart M. Wiener

(57) ABSTRACT

A method and device prevent a set-top terminal from accepting a download of new programming or data over a cable network when the download would be redundant of information already possessed by the set-top terminal or would cause an inconvenience to subscribers. When the set-top terminal is signaled that a new download is being offered, the set-top terminal checks to see if the download in fact contains a newer version of data or programming than is currently resident in the set-top terminal. The set-top terminal also checks whether criteria for accepting a download are met. The criteria are conditions that tend to indicate that an interruption of service to accept a download would not inconvenience the subscriber at that time. When the criteria are met, the download is accepted. Otherwise, the download is not accepted or is not accepted until the criteria are satisfied. Similar criteria govern the termination of the older, executing programming and the execution of the newer, downloaded programming to, again, prevent unwarranted disruptions in service.

27 Claims, 4 Drawing Sheets

U.S. PATENT DOCUMENTS

| | | | |
|---|---|---|---|
| 5,640,484 A | * | 6/1997 | Mankovitz .................... 386/83 |
| 5,666,293 A | * | 9/1997 | Metz et al. .................... 348/10 |
| 5,734,822 A | * | 3/1998 | Houha et al. ............. 395/200.6 |
| 5,771,064 A | * | 6/1998 | Lett ............................. 348/10 |
| 5,784,095 A | * | 7/1998 | Robbins et al. ............... 725/49 |
| 5,797,010 A | | 8/1998 | Brown |
| 5,826,166 A | * | 10/1998 | Brooks et al. ................ 348/10 |
| 5,847,771 A | * | 12/1998 | Cloutier et al. ............. 348/564 |
| 5,909,559 A | * | 6/1999 | So ............................. 395/307 |
| 5,935,004 A | * | 8/1999 | Tarr et al. ..................... 463/40 |
| 5,943,321 A | * | 8/1999 | St-Hilaire et al. ........... 370/259 |
| 5,951,639 A | * | 9/1999 | MacInnis .................... 709/217 |
| 5,960,445 A | * | 9/1999 | Tamori et al. ............... 707/203 |
| 5,966,637 A | * | 10/1999 | Kanungo et al. .............. 348/10 |
| 5,978,855 A | * | 11/1999 | Metz et al. .................. 709/249 |
| 5,987,210 A | * | 11/1999 | Iggulden et al. ............... 386/46 |
| 6,014,429 A | * | 1/2000 | LaPorta et al. ........... 379/88.15 |
| 6,047,317 A | * | 4/2000 | Bisdikian et al. ............ 725/142 |
| 6,057,874 A | * | 5/2000 | Michaud ..................... 725/141 |
| 6,141,683 A | * | 10/2000 | Kraml et al. ................ 709/220 |
| 6,166,728 A | * | 12/2000 | Haman et al. ............... 345/719 |
| 6,253,375 B1 | * | 6/2001 | Gordon et al. ................ 725/88 |
| 6,331,876 B1 | * | 12/2001 | Koster et al. ................ 348/725 |

FOREIGN PATENT DOCUMENTS

| | | | |
|---|---|---|---|
| EP | 0 803 812 | | 10/1997 |
| EP | 39 42 248 | | 10/1997 |
| EP | 0 907 285 | | 4/1999 |
| EP | 0 907 285 A1 | | 4/1999 |
| EP | 0926 862 | | 6/1999 |
| WO | WO 97/30549 | | 8/1997 |
| WO | WO 99/31883 | * | 6/1999 |

\* cited by examiner

METHOD AND APPARATUS FOR PREVENTING DISRUPTIONS IN SET-TOP TERMINAL FUNCTION DUE TO THE DOWNLOAD OF UPDATED PROGRAMMING OR DATA TO THE SET-TOP TERMINAL

FIELD OF THE INVENTION

The present invention relates to the field of cable television. More specifically, the present invention relates to the field of programming and updating the programming or data in a set-top terminal which connects a viewer's television, and possibly other electronic equipment, to the cable network. In particular, the present invention relates to a method and apparatus for preventing disruptions in cable television service due to the downloading of updated programming or data to the set-top terminal via the cable network.

BACKGROUND OF THE INVENTION

As shown in FIG. 2, a typical cable television network includes a signal headend (201). The signal headend (201) is a facility maintained by the cable television company from which the cable television signal is sent to subscribers over the cable network (203).

Each subscriber to the cable service is typically provided with a set-top terminal (202). The set-top terminal (202) is a box of electronic equipment that interfaces the subscriber's television, and possibly other electronic equipment, with the cable network (203).

The signal headend (201) broadcasts the cable television signal over the cable network (203) to the population of set-top terminals (202) possessed by individual subscribers. In addition to being connected to the cable network (203), each set-top terminal (202) also has a connection (204) to the subscriber's television and/or other electronic equipment to allow the subscriber to make use of the signals from the cable network (203).

The set-top terminals (202) include electronic memory (206) and a computer processor (205) which is programmed using the memory (206) to process and make use of the signals transmitted by the headend (201) over the cable network (203). The set-top terminals (202) may be programmed to provide a variety of services including decoding premium cable channels and providing electronic programming guides.

Periodically, as the cable system evolves, new features may become available or signal distribution may be refined in such a manner that the programming in the set-top terminal (202) needs to be updated in order to allow the terminal (202) to continue to provide the services of the cable system to subscribers with peak efficiency. If a technician must visit the home of each subscriber to upgrade the programming in the set-top terminals (202), the implementation of the upgrade becomes time-consuming and expensive.

To avoid these problems, new programming for the set-top terminal (202) can be transmitted to the terminal (202) over the cable network (203) itself. In this way, upgraded programming and data can be distributed automatically from the headend (201) without requiring a visit to each set-top terminal (202) individually.

However, additional problems arise in downloading updated programming and data over the cable network (203) to the set-top terminals (202). For instance, in conventional systems, when a set-top terminal (202) detects that data or updated programming is being offered by the headend (201) for downloading, the set-top terminal (202) automatically accepts the download and may erase existing data or programming from memory (206) in favor of the newly-received data or programming.

This will result in an interruption of service because the set-top terminal (202) will be unable to continue providing its normal functions while it is receiving new data and programming to replace that which has been erased. If the subscriber is attempting to watch television or use the set-top terminal during this time, the subscriber may be interrupted. These interruptions of the set-top terminal's normal functions may be completely unnecessary if the set-top terminal already happens to have the same version of the data or programming being offered for download over the network (203).

It may be possible to minimize the impact of this problem by only broadcasting updated data or programming to the set-top terminals (202) during off-peak hours when television is not commonly watched, such as between one and five a.m. However, this requires additional staffing for the headend facility (201) during those hours which is expensive. Additionally, there are subscribers who use their television service during all hours, even if only to record programming which will be watched later. Therefore, the interruption of set-top terminal functions during data download posses significant and sometimes unnecessary problems.

These problems may be exacerbated if the updated programming or data is broadcast to the set-top terminals (202) on an in-band channel as is anticipated in the near future. If the incoming data is on an in-band channel, the set-top terminal (202) will have to change the channel from the one the subscriber is watching or recording in order to tune to the channel over which the download is being provided. This will make normal television viewing and recording during the period of the download impossible.

Similar disruptions of service can occur when the set-top terminal is switching from running existing programming to the execution of new programming received in a download from the headend (201).

Consequently, there is a need in the art for a method and apparatus for preventing disruptions in cable television service due to the downloading and implementation of updated programming or data to the set-top terminal via the cable network.

SUMMARY OF THE INVENTION

It is an object of the present invention to meet the above-described needs and others. Specifically, it is an object of the present invention to provide a method and apparatus for preventing disruptions in set-top terminal function due to the downloading of updated programming or data via the cable network.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a set-top terminal for connecting a subscriber to a cable network that operates to prevent unnecessary and undue interruptions of service when accommodating a download of new programming or data over the cable network. A typical set-top terminal that is capable of implementing the present invention may include a processor and a memory unit for storing programming or other data used by the processor. When a download of data or programming is offered to the set-top terminal over the cable network, the processor only accepts the download and records the download in the memory unit when one or more predetermined criteria are satisfied. These criteria may be any conditions that tend to indicate that acceptance of the download will not interfere with the subscriber's use of the set-top terminal.

The criteria for acceptance of a download may be built into the set-top terminal or may be downloaded to the set-top terminal over the computer network. The criteria may include such factors as the time of day; or whether the set-top terminal is turned off. Additionally, the set-top terminal may signal the subscriber that a download is available and request permission to accept the download. A positive response by the subscriber to the request for permission to accept the download may be a criterion for accepting the download. Additionally, the set-top terminal may verify that the data or programming offered in the download is not already resident in memory before determining whether the one or more predetermined criteria are satisfied.

When the criteria for accepting a download have been met, the set-top terminal accepts the download and receives the updated programming or data. This may entail tuning to a specified channel to receive the incoming download. In accepting the download, the processor will typically erase data in the memory unit and replace the erased data with the upgraded data or programming from the download.

Additionally, once a download has been received, the set-top terminal may need to terminate the programming currently running on the terminal in favor of the new, upgraded programming received in the download. Under the present invention, the processor will again seek to satisfy one or more predetermined criteria before interrupting set-top terminal functioning in order to switch to execution of the new programming.

The present invention also encompasses a method for minimizing interruptions to the use of a set-top terminal for connecting a subscriber to a cable network where the interruptions result from downloading or implementing data or programming to the set-top terminal over the cable network.

BRIEF DESCRIPTION OF THE DRAWINGS

The accompanying drawings illustrate the present invention and are a part of the specification. Together with the following description, the drawings demonstrate and explain the principles of the present invention.

In the drawings, identical reference numerals indicate identical structure.

DETAILED DESCRIPTION OF THE PREFERRED EMBODIMENTS

Stated in broad principle, the present invention involves preventing the computer processor (205) of the set-top terminal from accepting every download of data or programming offered by the headend over the cable network unless predetermined criteria are satisfied. Consequently, unnecessary interruptions of the terminal functions or television signal usage are prevented.

Figure 1:
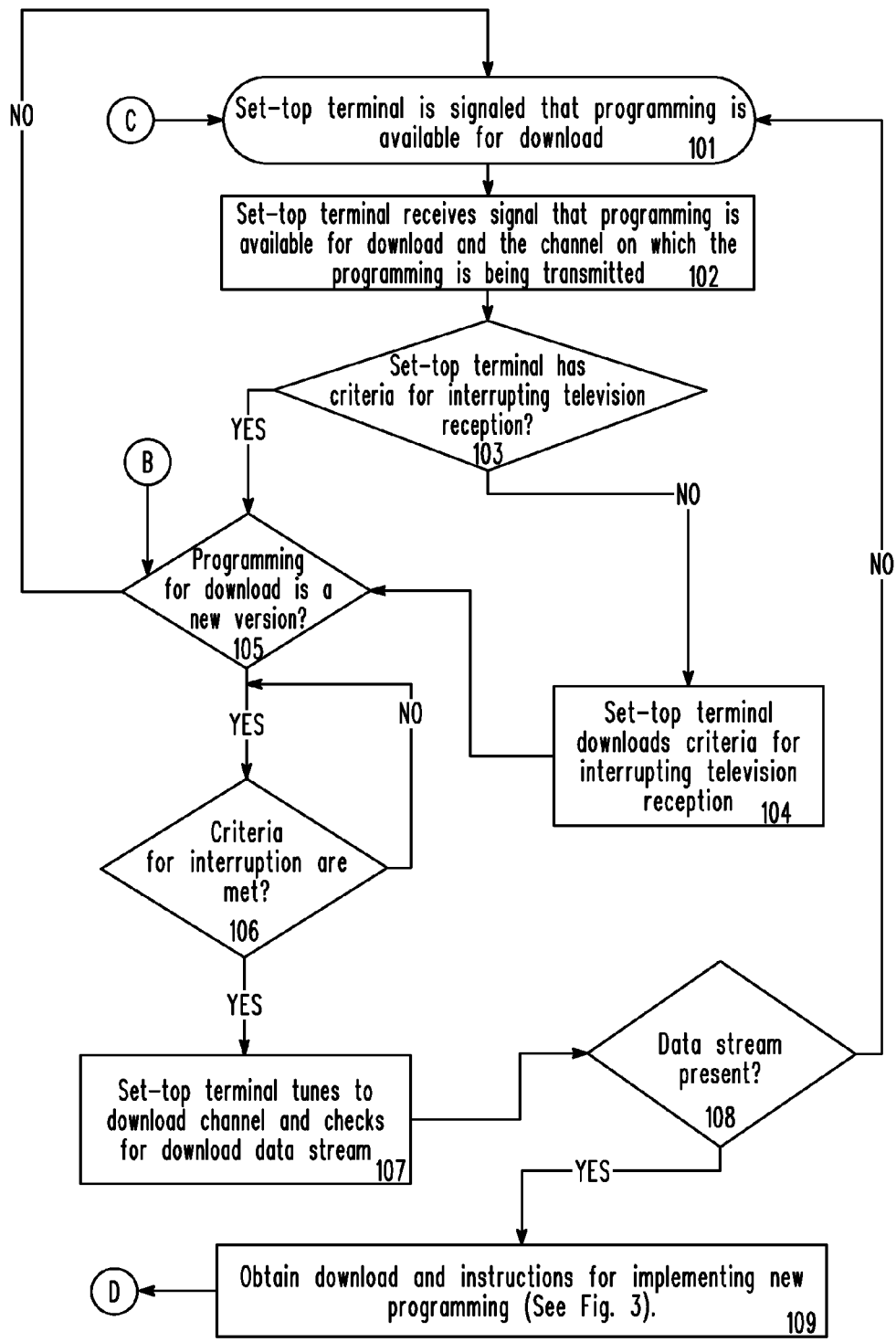
FIG. 1 is a flow chart of a method of managing the downloading of data or programming to a set-top terminal over a cable network without significant disruption in terminal functions according to the present invention.
Figure 2:
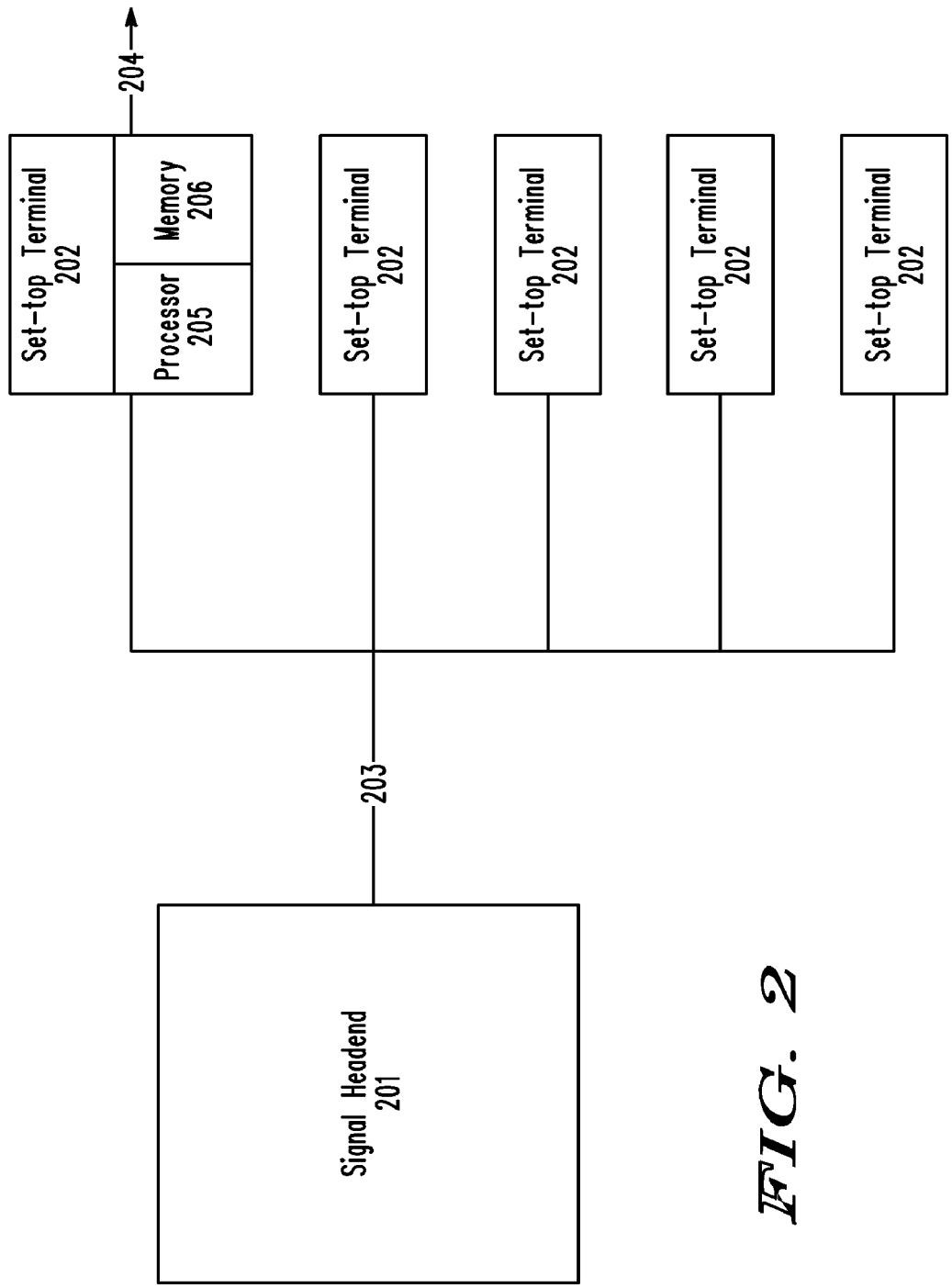
FIG. 2 is a block diagram of a cable television system, including a headend facility, a cable network and a population of set-top terminals, with which the present invention is practiced.

Using the drawings, the preferred embodiments of the present invention will now be explained. As shown in FIG. 1, the present invention begins with a set-top terminal (202) receiving a signal indicating that programming or data is available for download over the cable network (203). See step (101) in FIG. 1. The set-top terminal (202) may also be informed of the channel on which the download will be made available if that channel is an in-band channel (102).

Rather than immediately accepting the new download, under the principles of the present invention, certain criteria must be met before the set-top terminal (202) will abandon existing data or programming in favor of the download being offered. After the set-top terminal (202) is signaled that a download is being offered and the channel over which the download will be made, the set-top terminal (202) will determine whether it has the criteria that must be met for accepting a new download (103). The criteria may be downloaded to the terminal during initialization or a programming update, or may be built into the set-top terminal's factory-installed firmware.

If the set-top terminal (202) determines that it does not have the criteria for authorizing acceptance of an offered download, it may attempt to download the criteria from a control channel being broadcast by the headend (104). If no such criteria are programmed into the set-top terminal (202) or available for download, the set-top terminal (202) can be programmed to either operate conventionally and accept all incoming downloads, or to refuse to accept any downloads until criteria for authorizing a download are provided.

Once the criteria for accepting a download are obtained or located, the process continues. However, before the criteria for authorizing an interruption for accepting a download are checked, the set-top terminal (202) will verify that the data or programming being offered is a new version or does, in fact, represent an update from the data or programming the set-top terminal (202) already has (105). For example, it may be possible that a set-top terminal (202) which has been newly added to the population already has the latest data or programming which is being offered to the older terminals (202) in the population as a download over the network (203). In such a case, the set-top terminal (202) should refuse to interrupt its functioning to accept a download containing programming it already has.

The headend facility (201) will append a version identifier to offered downloads of data or programming so that the set-top terminals (202) can determine if the information being offered is new and, therefore, should potentially be accepted. As shown in FIG. 1, if the offered download is not new to the set-top terminal (202), the process reverts to step (101) in which the set-top terminal (202) waits for the next offering of a download over the network (203).

The offered download may also specify a class of set-top terminals to which it pertains. Thus, the set-top terminal (202) may also refuse a download unless the download is specified as being for the class of terminals to which that terminal belongs.

However, if the offered download does represent upgraded data or programming and is specified as being for that terminal, the set-top terminal (202) following the method of the present invention will next determine if the interruption criteria for accepting a download are met (106). The criteria for authorizing a download may include one or more conditions that would indicate that interruption of service to accept a download is acceptable at that time. For example, if the set-top terminal (202) is turned off or is in the logical off state, the subscriber is clearly not using the terminal (202) and will not be annoyed at a service interruption to accept a download. Therefore, the terminal (202) being off may be a criterion that authorizes acceptance of a download.

Alternatively, if the set-top terminal (202) is in use when a download is offered, the set-top terminal (202) may query the subscriber whether he or she wishes to accept the download. This query may be displayed on the television attached to the set-top terminal (202) or may be made through the instrumentality of the terminal (202) itself. If the subscriber signals acceptance of the download, the terminal (202) may then interrupt service and accept the download without annoying the subscriber.

Another criterion that may be used is the time of day. Certain hours, e.g. off-peak hours, may be designated as a criterion that completely or partially authorizes acceptance of a download. Other criteria that could be used by the set-top terminal (202) to determine when acceptance of a download will be the least intrusive to a subscriber will be apparent to those skilled in the art and are within the scope of the present invention.

As will also be apparent, any or all of these criteria may be used singly or in combination with each other. For example, the set-top terminal (202) may first verify that the set-top terminal (202) is turned off, but may then also determine the time of day so as to assess whether the set-top terminal (202) is likely to be turned on and used by the subscriber in the immediate future when a download is being accepted.

Additionally, if the viewer is using an on-screen graphics application which can be supported by the set-top terminal (202) while also downloading programming over the network, downloading may be authorized. This would be the case where a second, separate memory unit is provided for accepting and storing the downloading programming and the download is offered on an in-band channel.

If the criteria for accepting a download are not met, the set-top terminal (202) will not accept the download. The set-top terminal (202) may be programmed to periodically or continuously reassess the criteria and accept the download when the criteria become satisfied.

Additionally, the signal alerting the set-top terminal (202) that a download is available may include a deadline by which the terminal (202) must accept the download, if the terminal (202) determines that it needs or is intended to receive the download, e.g., the download represented updated programming or data compared to that already possessed by the terminal (202). If a deadline for accepting the download is set and the set-top terminal (202) has not been able to satisfy alternative criteria for accepting the download, the set top terminal (202) will, on that deadline, suspend service as necessary to accept the download (107). This provides more control to the system operator as to downloading new programming to the population of set-top terminals (202).

However, there might be the need for some flexibility in implementing the deadline for upgrade. For example, if the disruption to receive a download would interrupt a VCR recording a program, a pay-per-view event or other dedicated use of the set-top terminal, it may be preferable to delay the deadline until the disruption will cause less inconvenience to the user of the terminal. Set-top terminals may be equipped with a "remote control lockout" mode that the viewer may invoke to prevent accidental channel changes or other remote control errors during dedicated use of the set-top terminal (202). The terminal's (202) built in VCR timer automatically invokes a similar "record lockout" mode during a time period assigned for VCR recording.

Under the principles of the present invention, the set-top terminal may be programmed to respect these lockout modes and defer a deadline to download an upgraded programming version if any such lockout mode is detected. Additionally, the set-top terminal may include a separate, additional "lockout" feature which can be activated by the viewer to prevent any such controllable disruptions in service as those associated with accepting downloaded programming or switching between programming versions.

When the criteria for accepting a download are met, the set-top terminal (202) tunes to the channel on which the download is being offered, if necessary, and determines if the download is, in fact, being offered at that time (108). If the download is being offered, the set-top terminal (202) then proceeds to accept and, under circumstances described below, implement the new programming in favor of the older programming running on the terminal (202). See step (109).

Finally, with the update complete, the set-top terminal (202) returns to the state in which it waits to be signaled that a new download is being offered. (101). In this way, the interruptions resulting from acceptance of a download by the set-top terminal (202) are minimized as is the annoyance caused to subscribers from such interruptions.

Figure 3:
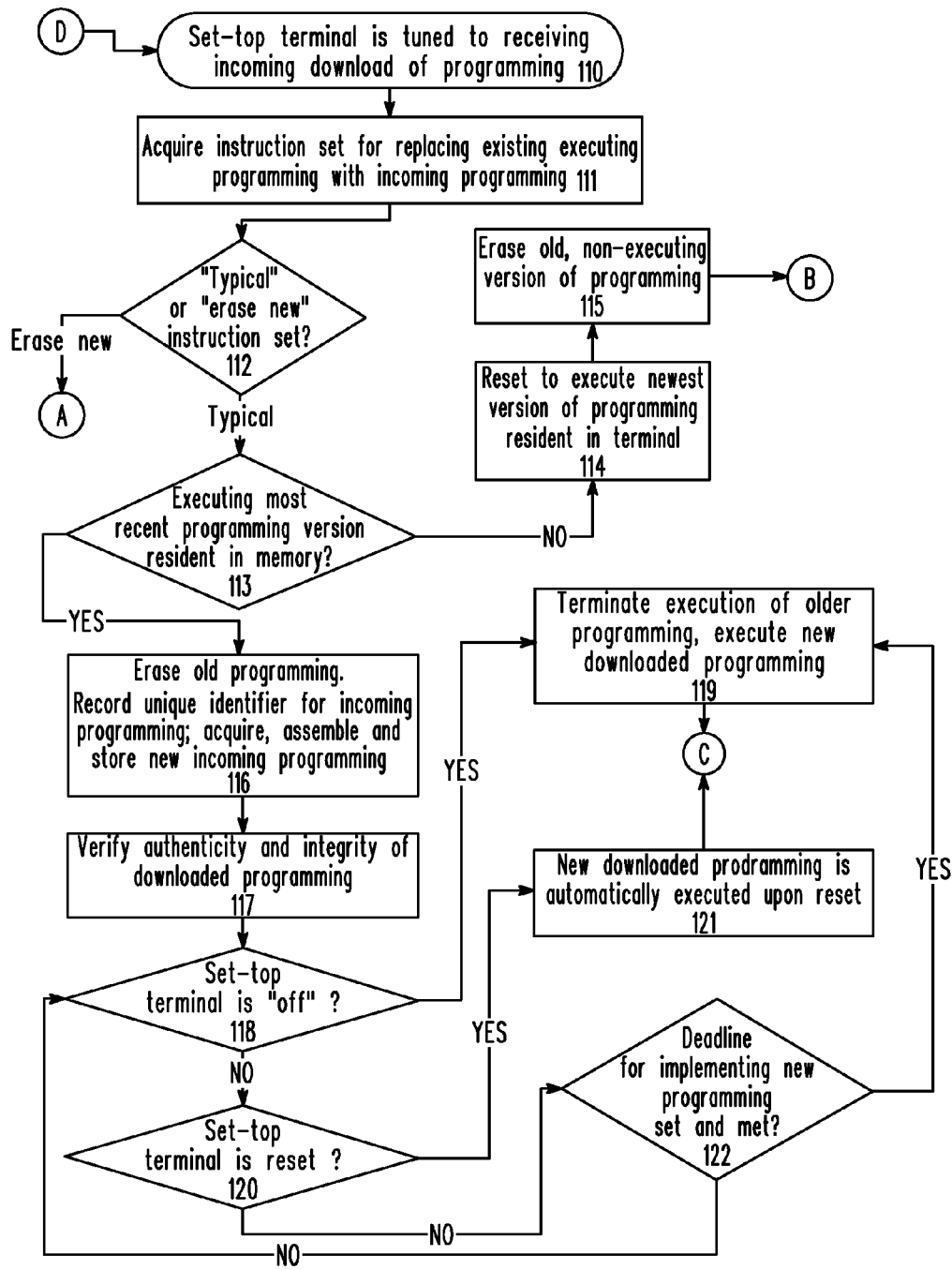
FIG. 3 is a flow chart showing execution of downloading and upgrading instructions within the method illustrated in FIG. 1.

The process of replacing an existing, executing programming object with a newly downloaded object will now be described in detail. When the set-top terminal has determined that the programming being offered over the network (203) is new (105), that the criteria for accepting a download are met (106), the set-top terminal acquires the data stream for the incoming programming (108). As shown in FIG. 3, upon acquiring the data stream (110), the set-top terminal receives instructions (111) with the downloaded programming for implementing that programming as a replacement for the software or firmware already running on or resident in the set-top terminal (202). These instructions may also optionally include a deadline by which the new programming in the download must be implemented and running on the set-top terminal (202).

Under the present invention, there are two basic instruction sets which might be provided to the set-top terminal to cause it to implement programming other than that currently running on the terminal (112). These two basic instruction sets can be described as a "typical" instruction set which will usually be used when an upgrade of programming is to be made, and an "erase new" instruction set used in testing or remediating programming.

The typical instruction set will direct the set-top terminal (202) to erase the existing programming or the old firmware without resetting. When such an instruction is received, the set-top terminal (202) will first determine whether or not it is executing the most recent version of programming that it has received (113). In some rare cases, the set-top terminal (202) may have the new programming that is being offered over the network (203) already stored in memory, but be running an older version. Where this is the case, it would obviously be an unwarranted interruption in service for the set-top terminal (202) to accept the incoming download of programming already stored in memory. Consequently, the set-top terminal (202) will first determine if it is executing the latest version of the programming being offered on the network (203) that it already has (113).

If the set-top terminal (202) finds a version of the offered programming in memory that is newer than the version being executed, the set-top terminal (202) will reset (114). After the reset, the most recent version of programming will automatically be executed (114).

Then, the set-top terminal (202) can once again compare the version of programming being executed with that being offered over the network (203). If the executing programming, after the reset, is the same version being offered over the network (203), the set-top terminal (202) has avoided an unnecessary extended interruption of service to download the programming from the network (203) that it already had.

Once the set-top terminal (202) has established that it is running the most recent version of programming that it possesses, that the programming being offered on the network (203) is a still more recent version, and that the criteria for accepting a download are met (106), the set-top terminal (202) will erase any old versions of the programming in memory which are not being executed (116) in order to make room for acceptance of the incoming programming from the network (203). The unique identifier from the incoming programming is recorded for comparison to that of later offerings of programming (116). The set-top terminal (202) also maintains a record of the progress of the download process for the incoming updated programming module.

The set-top terminal (202) accepts and stores all data identified as part of the programming module being offered for download (116). Based on the transmission protocol, the incoming programming module may be transmitted in multiple packets, which may be received in any order and reassembled into an executable object. Once the entire programming object is acquired, assembled and stored, it is subjected to a checksum integrity check (117). Upon passing the integrity check, the new programming is ready for execution.

Under the typical instruction set, the set-top terminal (202) will cease executing its existing programming in favor of the newly acquired programming under any of several conditions. First, if the set-top terminal (202) is powered, i.e., plugged in, but is turned "off," i.e., the user is not currently using the terminal (202), the set-top terminal (202) will halt the executing older programming and execute the newer, downloaded programming (118, 119). Or, if the set-top terminal (202) is in use, but detects a commercial break in the programming being watched by the viewer, implementation of the newer programming (119) may be initiated. Disruption during a commercial break is much less likely to inconvenience the viewer.

Alternatively, if the set-top terminal (202) is reset for any reason, the newly acquired programming will automatically be executed in favor of any older version as noted above (120, 121). The reset may be caused manually at the set-top terminal (202) or may be initiated by the cable television service provider with a reset signal transmitted over the cable network (203). In either situation, the inconvenience to the subscriber due to the switch between software versions can and should be minimized.

Finally, if a deadline for implementation is associated with the newly acquired programming, the set top terminal (202) will, on that deadline, terminate the execution of the older programming and implement the new version (122,119). This allows a system controller to force the upgrade at a particular time if necessary to accommodate some change being made system-wide which requires all set top terminals (202) to be running the latest programming. Such a consideration may override concerns about a temporary inconvenience to individual subscribers due to service interruption associated with switching to a newer version of programming.

However, there might be the need for some flexibility in implementing the deadline for upgrade. For example, if the switch to the new programming version-would interrupt a VCR recording a program, a pay-per-view event or other dedicated use of the set-top terminal, it may be preferable to delay the deadline until the disruption will cause less inconvenience to the user of the terminal. Set-top terminals may be equipped with a "remote control lockout" mode that the viewer may invoke to prevent accidental channel changes or other remote control errors during dedicated use of the set-top terminal (202). The terminal's (202) built in VCR timer automatically invokes a similar "record lockout" mode during a time period assigned for VCR recording.

Under the principles of the present invention, the set-top terminal may be programmed to respect these lockout modes and defer the switch to an upgraded programming version if any such lockout mode is detected. Additionally, the set-top terminal may include a separate, additional "lockout" feature which can be activated by the viewer to prevent any such controllable disruptions in service as those associated with accepting downloaded programming or switching between programming versions.

As another alternative, if the set-top terminal (202) is turned on and actively providing service to a viewer, the terminal (202) might advise the viewer that an updated programming image has been received and is waiting to be executed. The terminal might so advise the viewer through an on-screen display message or via a display on the set-top terminal (202) itself. If the viewer signals consent for switching from the older, executing programming to the newer, downloaded programming, the set-top terminal (202) can proceed to step (119), terminate the execution of the older programming and execute the newer, downloaded programming without annoying the viewer.

The foregoing describes the "typical" instruction set provided with new programming over the network for implementing the new programming in favor of existing programming in each set-top terminal (202). However, the second instruction set may sometimes be called for. The second "erase new" instruction set directs the set-top terminal (202) to erase its newest programming and reset.

Figure 4:
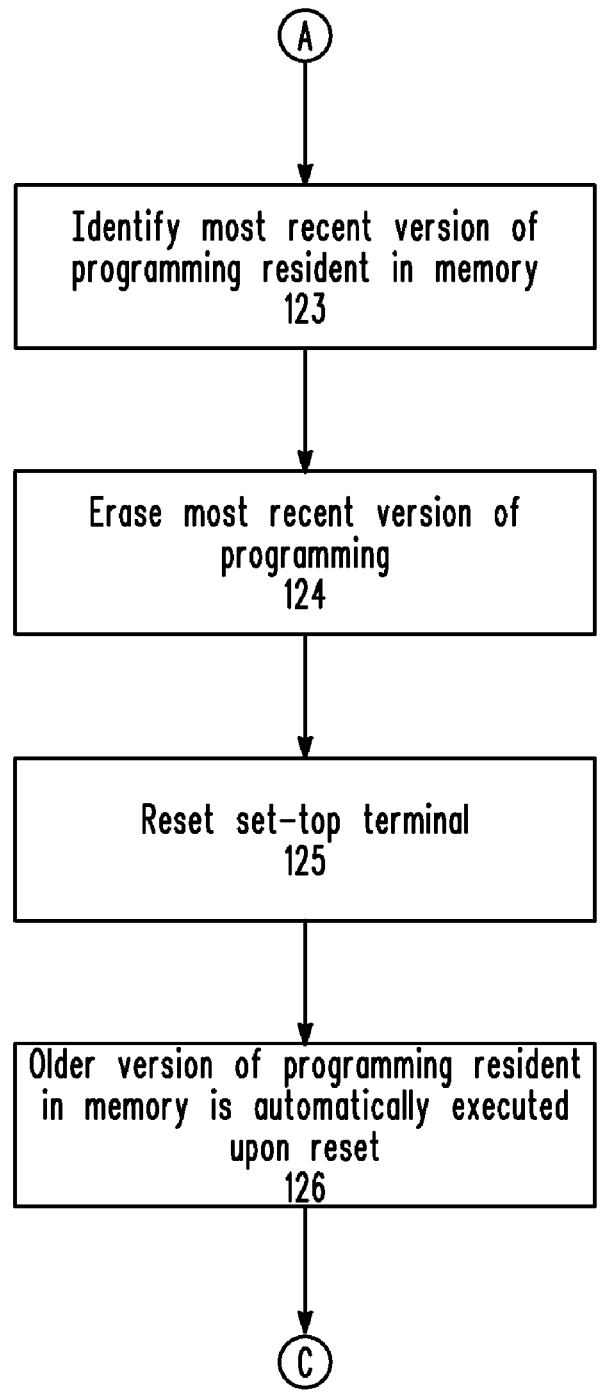
FIG. 4 is a flow chart showing execution of alternative downloading instructions within the method illustrated in FIGS. 1 and 3.

This second instructional set may be used when the cable system operator has transmitted a programming version to set-top terminals on a trial basis or has discovered a problem with programming that has been transmitted such that it becomes necessary to have the set-top terminals (202) revert to the previous version of the programming. Upon receipt of the instructional set to erase the newest programming and reset (112), the set-top terminal (202) will identify the most recent version of the appropriate programming (123) and erase it from memory (124). As shown in FIG. 4, the set-top terminal (202) then resets (125) which causes the execution of the older (now most recent) version of the programming, which is still resident in memory (126).

In the various processes described above in which programming is upgraded in the set-top terminal (202), the set-top terminal (202) regularly possess two subsequent versions of a programming object, for example, an older version which is executing and a newer version waiting for conditions to obtain under which it will be executed. After a switch, the set-top terminal (202) will have the newer, executing version of the programming and the older version which has now had its execution terminated.

To accommodate this usual residence of two successive versions of a programming object or firmware image, the programming is preferably position-independent within memory such that it can be executed in the FLASH memory regardless of the absolute address to which it is loaded. This will simplify the design of the loader and minimize the cost. However, this feature is not feasible for all microprocessor firmware.

Without position-independence, there are at least two ways to manage dual firmware images. Either firmware image may be copied to RAM at a known location in order to execute. Alternatively, each download might include two versions of the firmware, one for execution from the "upper" half of the FLASH memory and one for execution from the "lower" half of the FLASH memory. The set-top terminal can then acquire the appropriate version depending on which half of the FLASH memory is vacant for storing the incoming download.

Alternatively, two independent and, preferably, identical FLASH memory components could be provided. Each memory component would separately contain an image of the programming, newer and older versions. At the expense of providing an additional memory component this would eliminate the problem of properly locating within a single memory device each independent programming image. Moreover, the terminal (202) firmware will not need extra logic to partition a single memory component, but would require I/O hardware logic for alternating between the two memory components as needed.

Additionally, the transmitted programming may be compressed so that it takes less time to transmit and requires less space to store in FLASH memory. With such compression, the programming could then be decompressed in RAM and executed from there following the decompression.

As noted above, the memory used for storage of the downloaded programming will typically be FLASH memory, but could alternatively be battery-backed RAM or other writable, non-volatile memory.

It is also possible to prevent set-top terminals which are known not to need or be compatible with a particular download from even receiving the offered download. In emerging cable networks, each set-top terminal will be uniquely addressable. Consequently, the system controller could selectively transmit the new programming to a defined subset of terminals rather than broadcasting the download to all terminals in the system.

Another way to minimize the interruptions associated with receiving new programming downloaded over the cable network is to have a dual processor system. The dual processor system includes a dedicated processor which manages the downloading of the new programming in the background while a primary processor continues to execute the existing programming providing a user interface even while the download is in progress.

Without a dual-processor system, the priority of the task taking care of the download can be set appropriately, with respect to other tasks handling the platform services and the user interface, such that latency or disruption in the user interface is minimized.

The preceding description has been presented only to illustrate and describe the invention. It is not intended to be exhaustive or to limit the invention to any precise form disclosed. Many modifications and variations are possible in light of the above teaching.

For example, some of the steps in the method of the present invention can be reordered without departing from the spirit and scope of the present invention.

For instance, the set-top terminal (202) may verify that the offered download is a new version of data or a programming (105) compared with what is already stored in memory (206) before locating or downloading the criteria for accepting a download (103).

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A set-top terminal for connecting a subscriber to a cable network said terminal comprising:
    a processor; and
    a memory unit,
    wherein the processor monitors an out-of-band control channel of the cable network for information indicating that a download of data or programming is available and indicating a specified in-band channel for receiving the download of data or programming offered to said set-top terminal over said cable network wherein said processor only accepts said download on said specified in-band channel and records said download in said memory unit when one or more predetermined criteria are satisfied, and wherein said criteria when satisfied indicates that acceptance of said download will cause a minimum of interference with said subscriber's use of said set-top terminal; and
    wherein each download of programming contains two versions of a programming object, a first programming object for storage in and execution from a first memory section of said memory unit and a second programming object for storage in and execution from a second memory section, of said memory unit wherein said processor downloads one of said two versions of programming in accordance with whether said first or second memory sections is vacant.

2. The terminal of claim 1, wherein said one or more criteria are downloaded to said set-top terminal over said cable network.

3. The terminal of claim 1, wherein said set-top terminal verifies that said data or programming offered as said download is not already resident in said memory.

4. The terminal of claim 1, wherein said set-top terminal verifies that said data or programming offered as said download is specified as being intended for a class of terminals to which said set-top terminal belongs.

5. The terminal of claim 1, wherein said one or more criteria include a time of day.

6. The terminal of claim 1, wherein said one or more criteria include whether said set-top terminal is turned off.

7. The terminal of claim 1, wherein said one or more criteria include a deadline by which acceptance of said download is required by an operator of said cable network, said deadline being a specific point in time subsequent to an initial offering of said download of data or programming.

8. The terminal of claim 7, wherein said set-top terminal defers said deadline if said set-top terminal is being used to provide a dedicated service including recording programming in conjunction with a VCR or providing pay-per-view programming.

9. The terminal of claim 1, wherein said set-top terminal signals said subscriber that said download is available and requests permission to accept said download, said one or more criteria including a positive response by said subscriber to said request for permission to accept said download.

10. The terminal of claim 1, wherein said set-top terminal tunes to said specified in-band channel to receive said download if said one or more criteria are satisfied.

11. The terminal of claim 1, wherein if said one or more criteria are satisfied, said processor erases information in said memory unit and replaces said erased information with data or programming from said download.

12. The terminal of claim 1, wherein following said download of programming, said processor will only execute newly-received programming from said download when one or more predetermined criteria are satisfied.

13. The terminal of claim 1, wherein, prior to accepting said download, said processor determines whether any programming is stored in said memory which is not being executed, but which is identified as being a later version than programming being executed by said processor at that time; if said processor locates any such later version of programming in memory, said processor will terminate execution of the programming being executed, erase said terminated programming from memory and reset so as to execute said later version of said programming.

14. The terminal of claim 1, wherein, when said one or more criteria for accepting said download have been satisfied, said processor will erase from said memory any older, non-executing version of said programming already resident in memory and replace said erased programming with new programming from said download.

15. The terminal of claim 1, wherein said memory unit is logically partitioned into two sections, a first section for containing programming being executed by said processor and a second section for receiving and storing programming from said download.

16. The terminal of claim 1, wherein said memory unit comprises two separate memory devices, a first memory device for containing programming being executed by said processor and a second memory device for receiving and storing programming from said download.

17. The terminal of claim 1, wherein said programming is received in packets, said terminal being configured to reassemble said packets into an executable object and stored into non-volatile memory.

18. A method for minimizing interruptions to use of a set-top terminal that connects a subscriber to a cable network where said interruptions result from downloading data or programming to said set-top terminal over said cable network the method comprising the steps of:
receiving a signal from a headend identifying a specified in-band channel on which said download is available wherein the received signal is obtained via an out-of-band control channel of the cable network;
accepting said download on said specified in-band channel only when one or more predetermined criteria are satisfied, said criteria when satisfied indicating that acceptance of said download will not interfere with said subscriber's use of said set-top terminal; and
partitioning said memory unit into two memory sections a first memory section for containing programming being executed by said processor and a second memory section for receiving and storing programming from said download;
wherein each download of programming contains two versions of a programming object, a first programming object for storage in and execution from said first memory section and a second programming object for storage in and execution from said second memory section, wherein said method further comprises selectively downloading one of said two versions of programming in accordance with whether said first or second memory section is vacant.

19. The method of claim 18, further comprising downloading said one or more criteria to said set-top terminal over said cable network.

20. The method of claim 18, further comprising verifying that said data or programming offered as said download is not already resident in said set-top terminal.

21. The method of claim 18, wherein said method further comprising verifying whether said one or more predetermined criteria are satisfied.

22. The method of claim 21, wherein said verifying comprises comparing a time of day against a predetermined acceptable time of day for accepting a download.

23. The method of claim 21, wherein said verifying comprises determining whether said set-top terminal is turned off.

24. The method of claim 18, further comprising signaling said subscriber that said download is available and requesting permission to accept said download, wherein said one or more criteria include receiving a positive response by said subscriber to said request for permission to accept said download.

25. The method of claim 18, further comprising, subsequent to said download of programming, executing newly-received programming from said download only when one or more predetermined criteria are satisfied.

26. The method of claim 18, wherein, prior to accepting said download, said method comprises:
determining whether any programming is stored in said memory which is not being executed, but which is identified as being a later version than programming running on said set-top terminal at that time; and,
if any such later version of programming is located in memory, terminating execution of the programming being executed, erasing said terminated programming from memory and resetting said set-top terminal so as to execute said later version of said programming.

27. The method of claim 18, wherein, when said one or more criteria for accepting said download have been satisfied, said method further comprises erasing from said memory any older, non-executing version of said programming already resident in memory and replace said erased programming with new programming from said download.

* * * * *